United States Patent [19]

Keller

[11] 3,885,244

[45] May 20, 1975

[54] METHOD OF PRODUCING COLOR CORRECTION SIGNALS AND COLOR SEPARATION SIGNALS

[75] Inventor: Hans Keller, Kiel-Wik, Germany

[73] Assignee: Dr. Ing. Rudolf Hell, Germany

[22] Filed: Sept. 17, 1973

[21] Appl. No.: 398,197

Related U.S. Application Data

[63] Continuation of Ser. No. 99,011, Dec. 17, 1970, abandoned, which is a continuation-in-part of Ser. No. 744,720, July 15, 1968, abandoned.

[52] U.S. Cl. .......... 358/80
[51] Int. Cl. .......... H04n 1/46
[58] Field of Search .......... 178/5.2 A

[56] References Cited

UNITED STATES PATENTS 3,600,505 8/1971 Dobouney .......... 178/5.2 A

*Primary Examiner*—Robert L. Griffin
*Assistant Examiner*—George G. Stellar
*Attorney, Agent, or Firm*—Hill, Gross, Simpson, Van Santen, Steadman, Chiara & Simpson

[57] ABSTRACT

A method for producing color correction signals including forming negative and positive going signal portions representing each of the three primary colors, adding each positive signal of each primary color with each negative signal respectively of each other primary color and vice versa, thereby developing positive and negative signal sets with each positive or negative signal thereof representing two basic colors, and adding each of said positive or negative signals with another of said signals of opposite polarity, thereby developing positive and negative signal outputs representing each of the basic colors separately.

7 Claims, 10 Drawing Figures

INVENTOR
Hans Keller

BY Hill, Sherman, Meroni, Gross & Simpson ATTYS.

INVENTOR
Hans Keller

Hill, Sherman, Meroni, Gross & Simpson

BY ATTYS.

INVENTOR.
Hans Keller

BY Hill, Sherman, Meroni, Gross & Simpson ATTORNEYS

INVENTOR.
Hans Keller

BY Hill, Sherman, Meroni, Gross & Simpson ATTORNEYS

INVENTOR
Hans Keller

BY Hill, Sherman, Meroni, Gross & Simpson
ATTORNEYS

AC selection circuit

INVENTOR.
Hans Keller

BY Hill Sherman Meroni Gross & Simpson
ATTORNEYS

METHOD OF PRODUCING COLOR CORRECTION SIGNALS AND COLOR SEPARATION SIGNALS

This application is a continuation application of Ser. No. 99,011, filed Dec. 17, 1970 now abandoned, which is a continuation-in-part of application Ser. No. 744,720, filed July 15, 1968 now abandoned.

BACKGROUND OF THE INVENTION

Description of the Prior Art

The field of art to which this invention pertains is multi-color printing utilizing as primary colors the three subtraction colors yellow, magenta and cyan, and a fourth color black. More particularly the present invention relates to a new and improved method of color correction of primary color separation signals in such a way that the primary color separation signals are modified by color correction signals which are derived from the primary color separation signals, themselves. Each of the primary color separation signals (which are derived from photoelectric scanning of a colored picture original) comprises the colors black and one of the primary colors and also a variety of components of the other primary colors. This is because the chromatic reflectivities or transmissivities of the picture original to be scanned by a convenient scanning apparatus such as described in the patent of Boyajean, U.S. Pat. No. 23,914, dated Dec. 21, 1954 or in the patent of Murray and Morse U.S. Pat. No. 2,253,086 do not have the desired spectral distribution.

For this reason it is a principle aim of the present invention to remove these undesired components of the primary color separation signals by color correction. Devices are used for carrying out methods of this type wherein the color picture original to be reproduced is photoelectrically scanned n successive lines, the light from the scanned picture is separated by color filters into red, green and blue components and these components are converted into electrical primary color separation signals with the aid of photomultipliers.

The color ink dosage necessary for reproduction is computed from these primary color separation signals. For this purpose each of the primary color separation signals is subjected to modification by the other primary color separation signals. This method is referred to as color correction.

The M. Farber (U.S. Pat. No. 2,981,792, dated Apr. 25, 1961) shows a color correction system used to simulate the solutions of the so-called Neugebauer equations in order to provide color correction signals. These correction signals are derived from the output of a matrix computer conforming to the linear portions and to an approximation of the non-linear functions of the group of Neugebauer equations. However, experience has taught that such an approximation does not meet the requirements of a high quality multi-color reproduction. In order to obtain better results there is no apparent way to use the correct solutions of the Neugebauer equations since these would in practice have to be solved simultaneously for each point of the picture original to be reproduced. Such a correct solution is not shown in the Farber Patent, and a realization of a solution requires an extreme complexity in the computing apparatus, because for a correct solution there must be considered fifteen terms for each primary color which means 45 terms for the three primary colors. An electronic circuit for a correct solution is not known, and it would be a too great technical effort to develop such an apparatus. Whether one color correction is sufficient, is, in the rule, determined with the aid of test colors, for which purpose six basic colors of the so called color space are used. They are represented by the three printing colors, mg, cy, ye and the three mixed colors of the first order, green, violet and orange. These basic colors are the corners of the so called color space. The known color correction systems use correction signals which are effective for two of these basic colors which means that they are effective for a color area which is represented by two basic colors. Such correction systems have the disadvantage that a change of color of the picture original in the area of only one basic color simultaneously causes a change of a second basic color during the reproduction. This means there will be a reproduction error in the area of the second basic color.

Field of the Invention

The field of art to which this invention pertains is color printing and in particular to developing color correction signals which may be used to modify the primary color signal to determine the color dosage required in the reproduction operation.

SUMMARY OF THE INVENTION

It is an important feature of the present invention to provide improved color correction signals.

It is another feature of this invention to provide individual color correction signals for each of the basic colors.

It is an object of the present invention to provide a method for forming color correction signals.

It is also an object of this invention to provide a method for forming six individual color correction signals each corresponding to one of the six basic colors.

It is another object of this invention to provide a method for forming difference signals from opposite polarity signals of the primary colors wherein the difference signals represent two of the six basic colors.

It is therefore an object of the present invention to provide a method for color correction in multi-color printing which effects a reproduction of high quality without complicated calculating operations and which is independently effective for each basic color.

Accordingly it is another object of this invention to provide improved color correction signals from the primary color separation signals.

It is still another object of the present invention to provide a method for forming second signals from first difference signals which are derived from the primary color separation signals wherein each of the second signals represents one of the six basic colors.

Yet another feature of this invention is, to provide six individual color correction signals from the second signals each corresponding to one of the six basic colors.

It is another object of this invention to provide a method to use the first difference signals for the color correction of the primary color separation signals.

It is still another object of the present invention to provide a method to use the second signals for the color correction of the primary color separation signals.

Accordingly it is a further object of this invention to provide a method for using the first difference signals and the signals for the color correction of the primary color separation signals.

These and other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE PREFERRED EMBODIMENT

Figure 1:
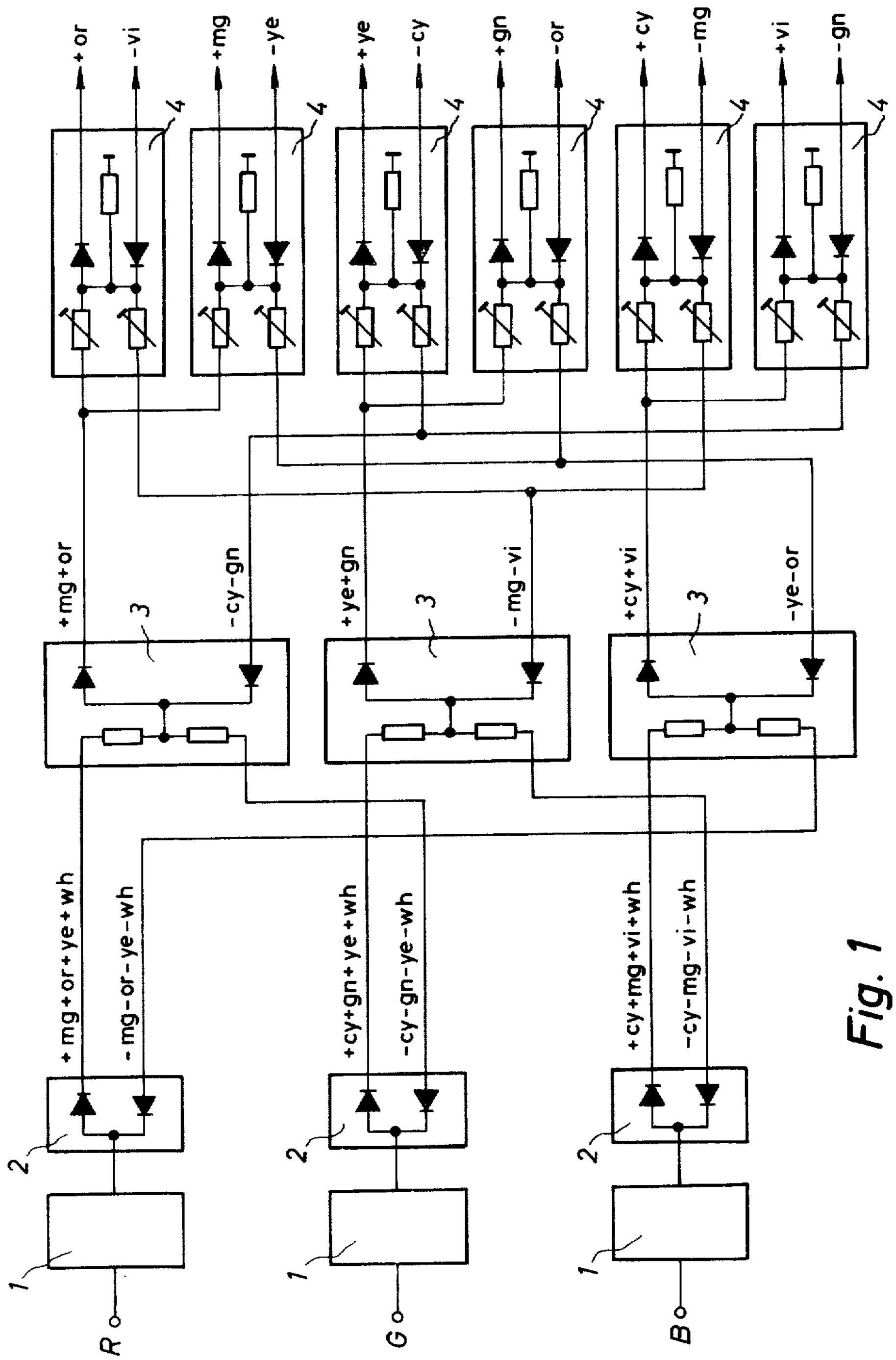
FIG. 1 shows a circuit arrangement for developing the individual color correction signals as set forth above.

The present invention relates to a method for producing color correction signals and color separation signals, the difference between the amplitudes of the trichromatic primary color signals being formed according to compensated masking, these difference signals being separated according to polarity and each of the separated signals representing predominantly two of the six basic colors of the color space, that means the colors, which are represented by the corners of the color space.

Devices are used for carrying out methods of this type wherein the colored picture original to be reproduced is photoelectrically scanned in successive lines, the light from the scanned picture is separated by color filters into red, green and blue components, and these components are converted into electrical primary color signals with the aid of photomultipliers. The color dosages necessary for reproduction are to be computed from these primary color signals. Each of the primary color signals are subjected to modification by the other primary color signals. This method is referred to as color correction.

Whether one color correction is sufficient is, as a rule, determined with the aid of test colors, for which purpose six basic colors of the color space are used. These are the three printing colors magenta, cyan and yellow and the three mixed colors of the first order green, violet and orange. The method of correction will hereinafter be described with the aid of these colors.

In methods for color correction used generally at the present time, either the difference signals are formed between two of the three primary color signals or two of the primary color signals are first mixed and the difference signals are formed with respect to the third. The difference signals are subsequently separated according to their polarity. The partial or difference signals obtained represent essentially still two colors, and for correction purposes, the uncorrected color separation signals are modified by the partial signals, that is to say by the correction signals. This modification results in corrected color separation or color dosage signals.

Due to color correction, the signal amplitudes of three of the six basic colors are to be raised to the signal level of the color white and the other three are to be lowered to the signal level of the color black. For each color signal to be corrected, there is available only four or even fewer variable correction signals which when the conditions are favorable, still affect two colors. This results in the fact that basically not all six basic colors of the color space can be completely corrected, and due to the coupling of pairs of colors in the correction signals the correction of an individual color leads to difficult adjustments.

According to the invention individual colors are corrected. This is effected by selecting each time a pair of partial signals from the partial signals representing two colors which have signal components representing the same basic color but with different polarities, removing the signal components of the same basic color from the sum signal by adding the amplitudes of the partial signals of such a pair, and separating out those signal components which represent the remaining two basic colors individually by separating the sum signal according to its polarity.

To this end, the amplitudes of the partial signals are selected to be so high that each time the common color signal component appears with like amplitude but with different polarity, then these signal components are neutralized when added, and the two remaining color signal components have different polarities and are therefore separable.

A further feature of the invention is that partial signals with the same amplitude but of opposite polarity are first produced from the existing partial signals whereupon pairs of such partial signals are time selected which have signal components representing the same basic color with the same polarity, and that finally the smaller of the two partial signals of such a pair, with regard to amplitude, is each time selected, which smaller signal represents still one basic color.

The amplitudes of the common color signal components are advantageously, but not necessarily, chosen to be of equal amount in the partial signals. Since the other two color signal components always occur only in one partial signal, but in the other are approximately zero, this smaller value, zero, will reach the output, that is to say only the common color signal component occurs in the output.

In case the color signals are not present in form of color negative signals from the beginning, the amplitudes of the color signals are inverted, partial signals with the same amplitude but of opposite polarity are first produced from the existing partial signals, then pairs of such partial signals are each time selected which have signal components representing each time the same basic color with the same polarity, and finally the larger of the two partial signals of such a pair, with regard to amplitude, is each time selected which larger signal represents one basic color.

The inversion of amplitudes is not necessarily associated with a definite function. Only uniqueness and continuity is required as given, for example, by the functions $x^{-a}$ or $b - x^c$ or $d - \log x$ in comparison with the function $x$ ($a$, $b$, $c$, $d$ are constants).

It is not necessary in carrying out the method according to the present invention that the color signals be present in rectified form. They may also be modulated on a carrier frequency and processed in a manner known per se by producing signals of opposite phase.

The selection of the individual basic color signals does not extend to the basic color in question alone, but to all colors of the same hue, the amplitude essentially being a measure of the color saturation. Each color signal sweeps over a scale of values whose distribution is not always favorable for the purposes intended. In accordance with the invention, the individual basic color signals obtained are therefore subjected before further use to a non-linear conversion, a so called contrast adjustment.

Finally, the signals obtained may, instead of being used as color correction signals, be used as color separation signals or together with other than the trichromatic primary color signals, as color separation signals.

To avoid encumbering of the disclosure of the present invention with information already familiar to those skilled in the art certain simplifications have been made, so that those reasonably skilled in the art can practice the present invention. Thus reasonable familiarity with conventional photoelectric scanning devices such as described in the Boyajean patent as well as familiarity with conventional engraving and multi-color printing techniques are supposed.

In the drawings, as well as in the description it has been deemed sufficient to illustrate known components by labeled blocks, but of course, where such a block is used to represent significant details of the invention its functions and contents will be shown in more detail in a subsequent figure and description. The method of the present invention is not limited to the special preferred embodiments shown in the figures; various alternative ways of arriving at equivalent results will occur to those skilled in the art. There can be used color signal voltages of analogous DC types as well as AC signal voltages using a logarithmic transformation of the signals or not.

The method of color correction of the present invention comprises several steps between the scanning of the picture original and the production of a color-corrected picture on a printing plate or an equivalent as follows:

1. The step of generating first difference signals which are formed between two of the primary color separation signals. The red, green and blue light beams are transformed in photomultipliers into uncorrected primary color separation signals which are fed to $\gamma$-correction stages. The $\gamma$-correction signals are converted by a logarithmic transformation into voltages which are proportional to the color densities of the scanned picture original. From these voltages are formed first difference signals between two of the three primary color separation signals or two of the primary color separation signals are firstly mixed and the difference signals are formed with respect to the third.

These first difference signals are subsequently separated into signals of positive and negative polarity. This is to obtain first color correction signals which comprise only two of the six basic colors of the color space.

2. A step of providing first color correction of the primary color separation signals by the separated first difference signals using a potentiometer to adjust the amount of correction of the primary color separation signals.

3. A step of providing second color correction signals from the separated first difference signals whereby six pairs of the separated first difference signals are selected, each representing only two of the basic colors and one common basic color. The same basic color of such a pair is removed and the pair is separated into two color correction signals, each representing only one basic color.

4. A step of providing a second color correction of the primary color separation signal for each basic color by each of the separated second color separation signals. A positive and a negative correction signal of the same basic color are selected and added in a resistor. The resistor is a potentiometer whose slider can pick up continuously every correction value from negative to positive values which are added to the primary color separation signal.

5. A step of providing a recording stage to reproduce the picture original as color-corrected separations, wherein the recording stage comprises a maximum selection circuit for the black separation, a gradation control unit, and an electron optical or mechanical recording system using glow lamps or an engraving stylus or any suitable recording means.

Referring now to the drawings, in FIG. 1, primary color signals R (red filter), G (green filter) and B (blue filter) obtained after color filtering in photomultipliers are subjected in preparation stages 1 to the usual conversions such as logarithmic and contrast adjustment, and are subsequently provided in polarity stages 2 with both polarities, e.g. by separate rectification of the positive and negative half waves of the carrier wave amplitude modulated signals or by producing signals of opposite phase. The references *mg*, *ye*, and *cy*, represent the basic colors magenta, yellow and cyan, and *or*, *gn*, *vi*, represent the primary mixed colors orange, green and blue-violet and *wh* represents white.

In adding stages 3, additions are each time formed from the positive signals of one channel and the negative signals of another channel; the difference signals are separated according to their polarity. The white signal and all grey signals are thereby completely removed from the difference signals. A further color signal is also removed from the difference signals apart from a relatively small residual amount, so that the signal components of two colors each predominantly remain on each of the basic signal outputs of the stages 3.

The amplitudes of two each of these partial or difference signals are now added in adding stages 4 with such an adjustable amplitude ratio that one of the color signal components appears with different polarity and equal amplitude and is consequently neutralized. The remaining signal components which represent still two basic colors are again separated according to their polarity. In this way, all six basic colors are available as signals with both polarities.

Figure 2:
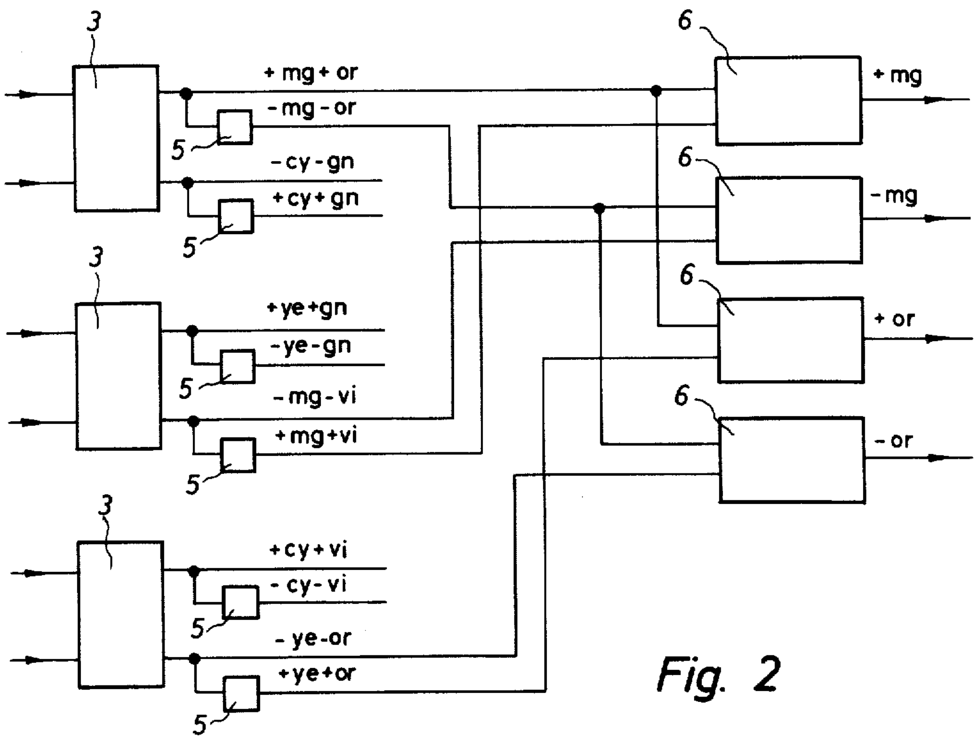
FIG. 2 is an alternate arrangement for carrying out the function performed by the circuit of FIG. 1.

The same problem is solved in a somewhat different manner by the circuit shown in FIG. 2. Here, the choice is illustrated in detail for two colors only, since the corresponding diagram for the other colors is apparent. In this case, the partial signals coming from the adding stages 3 are available with both polarities. This may, for example, be obtained by polarity-reversing stages 5. Pairs of partial signals are now formed in which the commonly present color signal component appears with the same polarity, and the smaller partial signal is each time chosen from the pairs in stages 6. It is advantageous to select the amplitude of the partial signals so that the common color signal component appears with about the same amplitude. For the other two basic colors, the amplitude at one input of the stages 6 is approximately zero, and this color signal component consequently does not reach the output of the stage 6.

Figure 3:
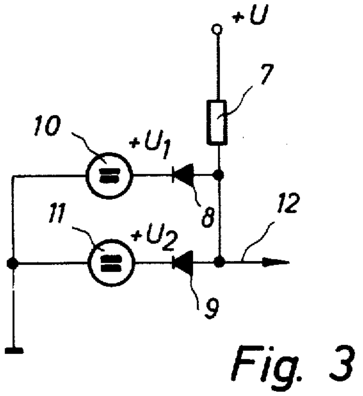
FIG. 3 shows a circuit for selecting the smaller of two signal voltages.

FIG. 3 shows, by way of example, a circuit for selecting the smaller of two voltages. A constant positive voltage U which is essentially greater than the voltages $U_1$ and $U_2$ to be compared, produces a current across a resistor 7 which flows through diodes 8 or 9 to which the lower positive signal voltage of the low-resistance voltage sources 10 and 11 is fed. The other diode is then blocked so that the lower voltage is found at the output 12.

The two types of color signal selection circuits illustrated are not the only ones possible. For example, should the color signals not be present from the beginning as color negative signals, the signals may be inverted in amplitude, (large made small and small made large) and then the greater signal voltage could be selected instead of the smaller.

By selecting six signals, each of which predominantly has a correcting effect on each of the six basic colors, it is not only possible to correct the primary color signals for three color printing, better and more easily for the operator, but there is also the possibility of using these signals themselves as color dosage signals in multi-color printing, as used in textile and wallpaper printing, as well as imprinting for packaging purposes. However, in all applications, it must be provided that the output signals must be subjected to a non-linear conversion (contrast adjustment). This results in the advantage of adaption, it being possible to distort the six signals or, in color correction, the twelve signals in different ways.

Finally, it is possible to use the color signals for producing special color separations. Therefore, for example, a separation signal could be corrected so that all six colors are corrected to the black value.

Figure 4:
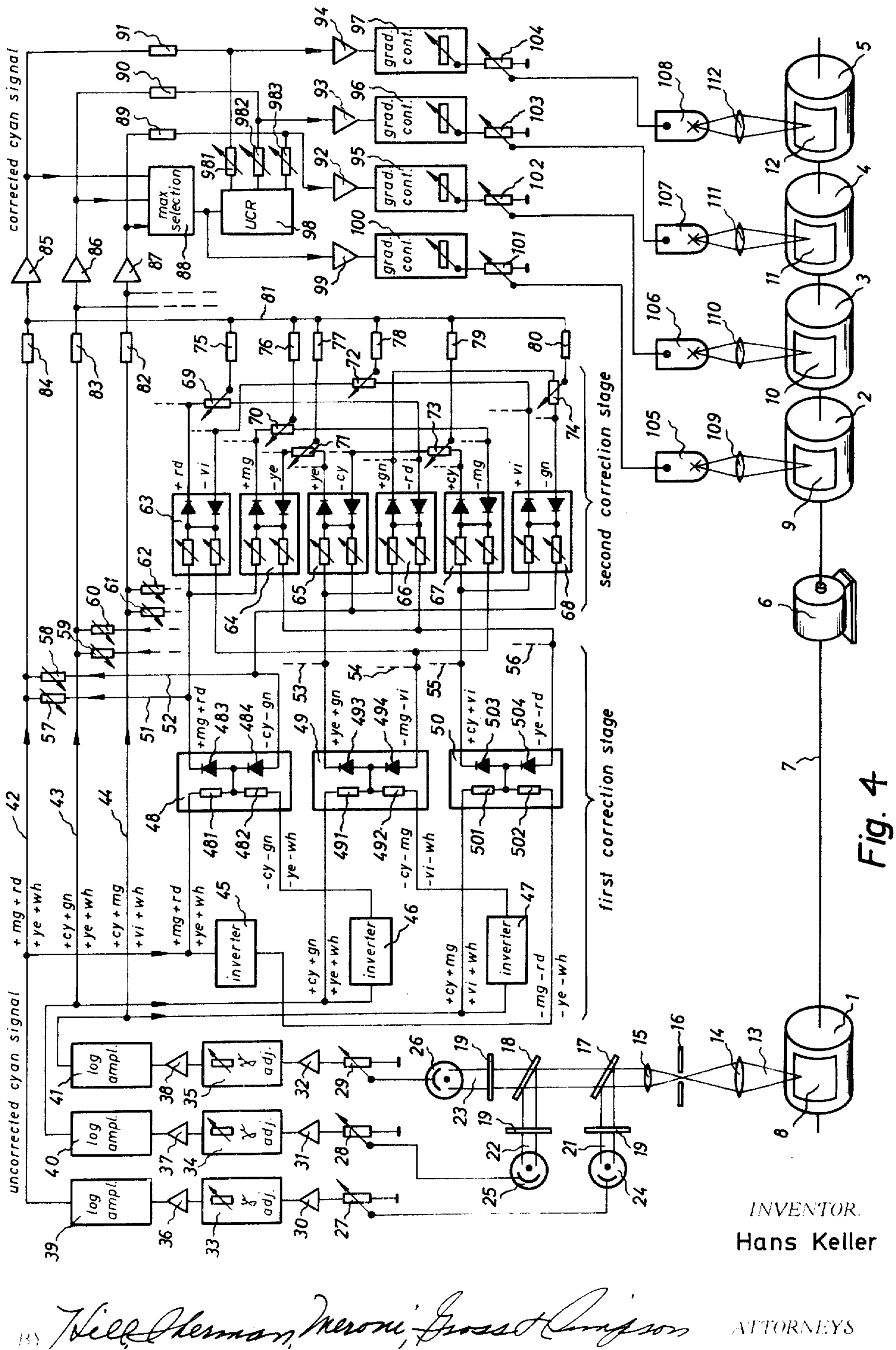
FIG. 4 is a schematic functional diagram of a complete color correction system for electrical color correction signals in accordance with the invention.
Figure 5:
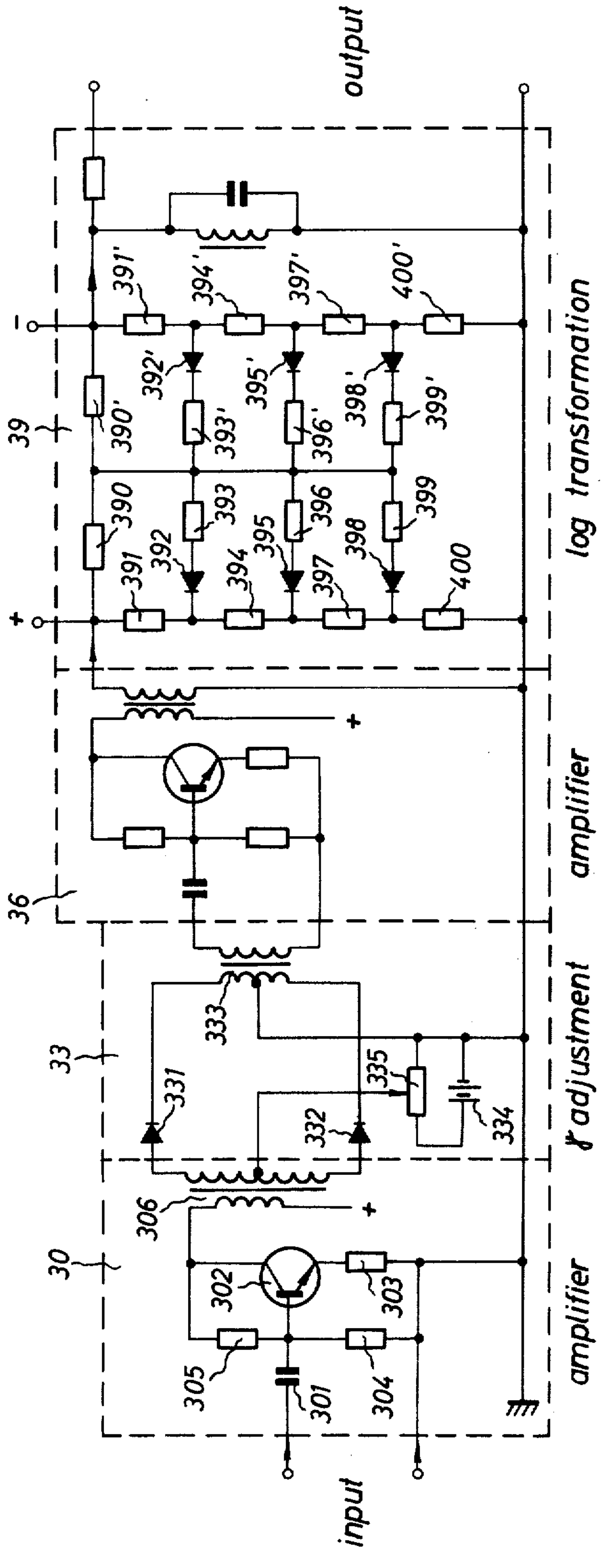
FIG. 5 is a circuit arrangement of the γ-adjustment stage and of a non-linear network for the logarithmic transformation of the primary color separation signals.

FIG. 4 of the drawings is a schematic of a color scanner according to the present invention. A rotating drum 1 and four rotating drums 2, 3, 4 and 5 are synchronously driven by a motor 6 through a common shaft 7. The rotating drum 1 has a color picture original 8 to be scanned and reproduced as color separations 9, 10, 11 and 12 on the recording drums 2, 3, 4 and 5. The color picture original 8 is scanned and the reflected or transmitted light beam 13 is focused by lenses 14 and 15 and a shutter 16. This focused light beam is trichromatically split by interference filters 17 and 18 and by glass filters 19 into three light beams 21, 22 and 23 of the primary colors red, green and blue. These light beams are converted by means of photomultipliers 24, 25 and 26 into corresponding electrical signals which represent the uncorrected primary color separation signals and which are controlled by potentiometers 27, 28 and 29 to give an equal level to the preamplifiers 30, 31 and 32 and the adjusting stages 33, 34 and 35. The adjusting stages are followed by the amplifiers 36, 37 and 38 and logarithmic amplifiers stages 39, 40 and 41. A typical embodiment of the stages 30 - 39 in which the primary color separation signals are subjected to the usual conversions is shown in FIG. 5.

Figure 9:
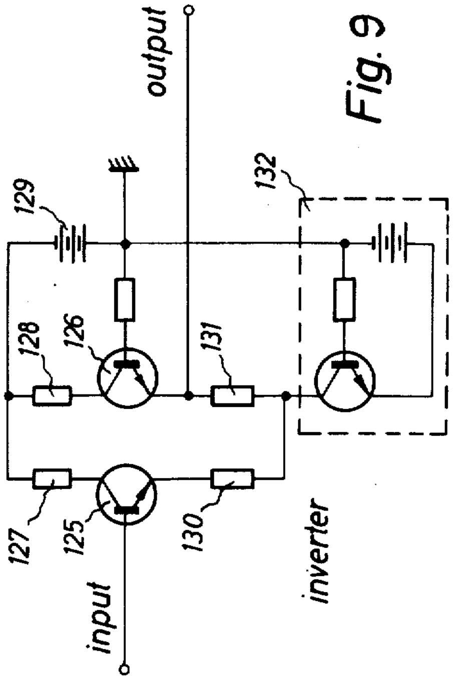
FIG. 9 is an inverter circuit as used in FIGS. 4 and 8.

The uncorrected primary color separation signals at the output of the logarithmic amplifiers, which are proportional to the density of the color picture original, are subsequently submitted to a first color correction. For this purpose the primary color separation signals are fed over lines 42, 43 and 44 to inverting stages 45, 46 and 47 and to adding and separation stages 48, 49 and 50. Such an inverting stage is shown in FIG. 9. The adding and separation stage comprises an adding circuit and a rectifier circuit, consisting, for instance, of the resistors 481 and 482 and of the diodes 483 and 484. In the adding stages 48–50 additions are each formed from a positive primary color separation signal of one color and a negative, i.e. inverted signal of another color to obtain the first difference signals. These first difference signals are separated into two correction signals according to their polarity.

Each of these correction signals represents only two basic colors, and the white and gray signal components are thereby completely removed. These separated first difference signals, i.e., the first color correction signals, are fed over lines 51–56 and across variable resistors 57–62 to the uncorrected primary color separation signals for a first color correction. The rate of the correction can be independently adjusted for each correction signal and for each polarity by the variable resistors 57–62.

In order to achieve a second and more specific color correction of the firstly corrected primary color separation signals, pairs of the separated first difference signals which appear at the outputs of the adding and separation stages 48–50 are selected to have signal components representing the same basic color but with different polarities. The amplitudes of two of each of these selected signals are supplied to adding stages 63–68 wherein the ratio of amplitudes is adjusted by variable resistors so that one of the signal components appears with different polarity and equal amplitude. Because of the opposite polarity of the components, one basic color is removed by the addition of the two signals. The remaining signals which still represent two basic colors are separated into two signals according to their polarity. After this separation, the signals represent only one basic color and thus form the second color correction signals.

In the FIG. 4 the second correction process is shown only for one primary color separation signal for the red filter signal cyan. For this second correction, pairs of the separated second correction signals of the same basic color are selected but with different polarities and are added by means of the potentiometers 69–74, the resistors 75–80 and the conductor 81 to the firstly corrected primary color separation signals. The correction value is adjustable by the potentiometers 69–74, and thus color correction for each of the six basic colors can be achieved. The resistors 82 - 84 are provided for decoupling the two correction stages.

After this second correction, the signals are amplified by the amplifiers 85–87 and fed to a black separation stage 88 and through resistors 89–91 and amplifiers 92–94 to the graduation stages 95–97. From the black separation stage 88, which selects the maximum signal of the separation signals, the black separation signal is passed to an undercolor removal stage 98 and through an amplifier 99 to the gradation stage 100. The black separation signal is converted in the undercolor removal stage and added over variable resistors 981–983 to the corrected color separation signals in order to reduce the amount of color in black and gray tone areas. In the gradation stages 95–97 and 100 the resulting separation signals are non-linearly distorted to be adapted to the peculiarities of the recording system, e.g. to the peculiarities of the printing colors and the film material. The amplitudes of these distorted signals are adjusted at the output of the gradation stages with potentiometers 101–104 according to the required densities. The recording lamps 105–108 are controlled by these signals and produce over the optical focussing systems 109–112 on the light-sensitive film material 9–12, the desired color separations.

FIG. 5 shows by way of example a circuit arrangement of the γ-adjusting stages 33–35 of FIG. 4 and a non-linear network for logarithmic transformation and amplification according to the stages 39–41 of FIG. 4. At the input of the stage 30 the primary color separation signal, which in this case has been modulated on an AC carrier of suitable frequency is fed to a conventional transistor amplifier. The modulation circuit has not been shown since such circuits are well known in the art. The stage 30 contains a conventional transistor amplifier, which consists of a capacitor 301, a transistor 302, the resistors 303, 304 and 305 and the transmitter 306. The secondary coil of the transformer 306 forms the input of the γ-adjusting stage 33 which comprises two diodes 331 and 332 which are connected to a transformer 333. Between the center tap of the secondary coil of the transformer 306 and of the primary coil of the transformer 333 there is interconnected an adjustable DC voltage source comprising the source 334 and the potentiometer 335 which supplies a biasing potential to the diodes 331 and 332 to vary the transmission of the full wave rectifier. The γ-adjusted signal is fed across an amplifier stage 36, which is similar to the stage 30, to a non-linear transformation stage 39 which is a balance network for a logarithmic function. The single parts of the logarithmic function are formed by the diode and resistor combinations 390–400 which are fed from a positive and a negative DC voltage source. For the negative half-waves there is provided an equal diode and resistor network 390' and 400'. Such a circuit as this is well known in the field of analog computers. For the suppression of underived harmonic waves which derive from the non-linearities of the diodes, there is provided at the output of the stage a resistor and a resonant circuit.

Figure 6:
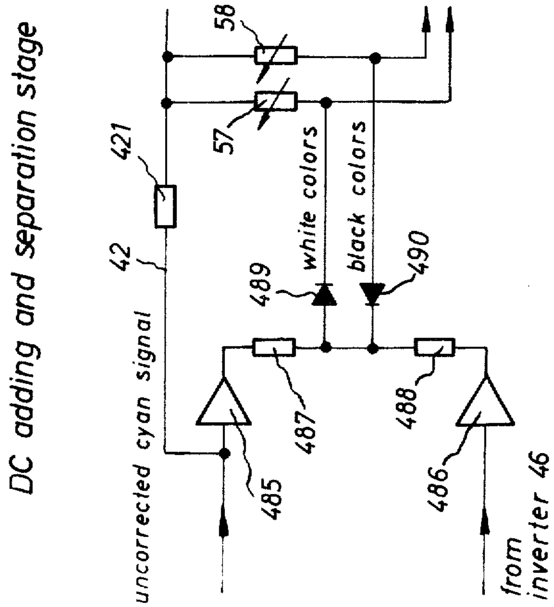
FIG. 6 is a schematic wiring diagram of a part of FIG. 4 applicable to form the first difference signals for DC primary color separation signals.

FIG. 6 shows in detail the contents of the adding and separation stage 48 of FIG. 4 for forming the first difference signals, i.e., the first correction signals from a DC primary color separation signal. The signals, coming from the line 42 and from the inverter 46 pass the preamplifiers 485 and 486 and are added over the resistors 487 and 488. After the addition, a separation into two signals is achieved by the rectifying diodes 489 and 490. The signal with positive polarity is the so called white color signal, and the signal with the negative polarity is the black color signal. These black and white color signals are added over the adjustable resistors 57 and 58 to the primary color separation signal, arriving on line 42 for a first compensating color correction. A resistor 421 is provided for decoupling the input from the output of the stage 48.

Figure 7:
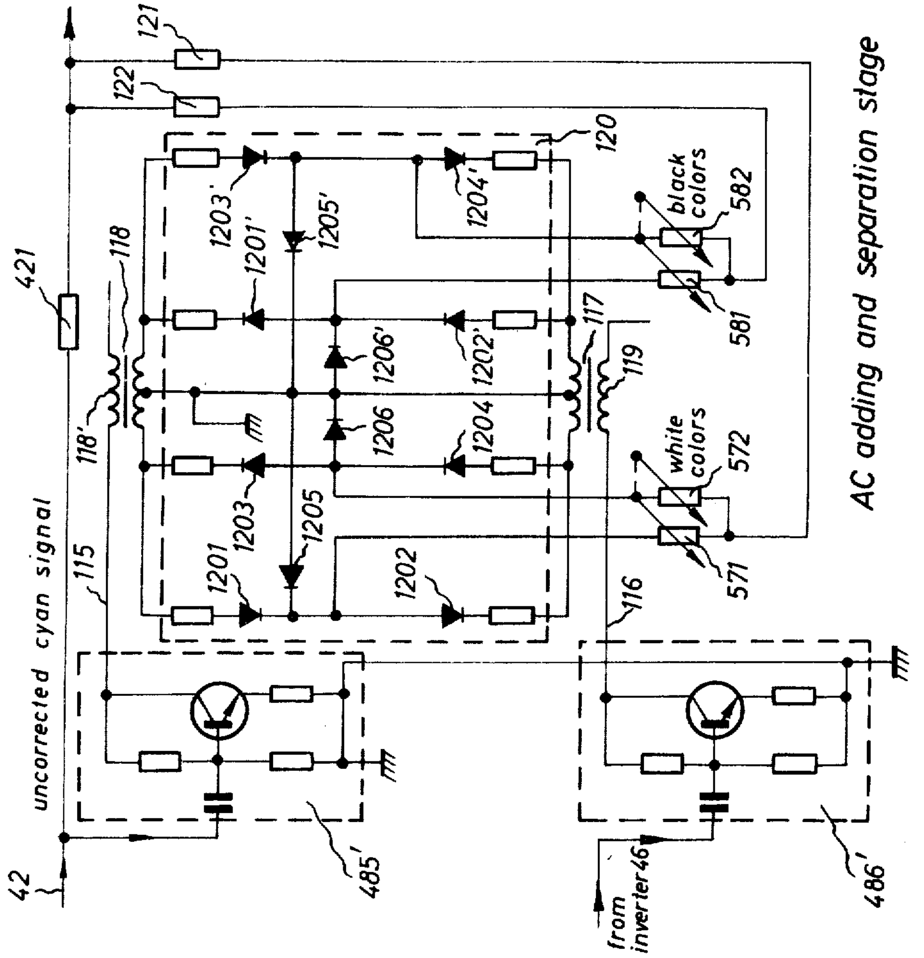
FIG. 7 is a modified form of FIG. 6 for AC primary color separation signals.

In FIG. 7 there is shown a variation of the embodiments of FIG. 6 for AC primary color separation signals. The AC signals coming from the line 42 and from the inverter are firstly amplified by the preamplifiers 485' and 486' which comprise well known amplifier circuits as shown in FIG. 5 in stage 30. The output signals of the preamplifiers are connected over conductors 115 and 116 to the primaries 118' and 119 of transformers 117 and 118. The center taps of the secondary coils of the transformers 117 and 118 are grounded. These transformers supply a diode circuit 120 which separates and compares the positive and negative components of the signals.

The signals arriving from the transformers 117 and 118 which are in opposite phase relationship to each other are split into positive and negative half-waves by the diodes 1201–1204 and 1201'–1204'. The positive half-wave of the diode 1201 is added to the negative half-wave of the diode 1202. If the sum signal is negative, it is suppressed by the diode 1205 if it is positive, it is added to the positive half-wave of the uncorrected primary color separation signal across the adjustable resistor 571 and the resistor 121. The negative half-wave coming from the diode 1203 is added to the positive half-wave of the diode 1204. If the sum is positive, it is suppressed by the diode 1206, and if the sum is negative, it is added to the negative half-wave of the uncorrected primary color separation signal across the adjustable resistor 572. This is called white color correction.

Black color correction is achieved by adding negative correction signals to the positive and by adding positive correction signals to the negative half-waves of the uncorrected primary color separation signals. For this purpose the positive half-wave coming from the diode 1203' is added to the negative half-wave coming from the diode 1204'. A positive sum signal is suppressed, and a negative sum signal is added to the positive half-wave of the uncorrected primary color separation signal by means of the adjustable resistor 582 and the resistor 122. The negative half-waves of the diode 1201' are added to the positive half-waves of the diode 1202'. If the sum signal is negative it is suppressed, and if the sum signal is positive, it is added across the adjustable resistor 581 and the resistor 122 to the positive half-wave of the uncorrected primary color separation signal.

Figure 8:
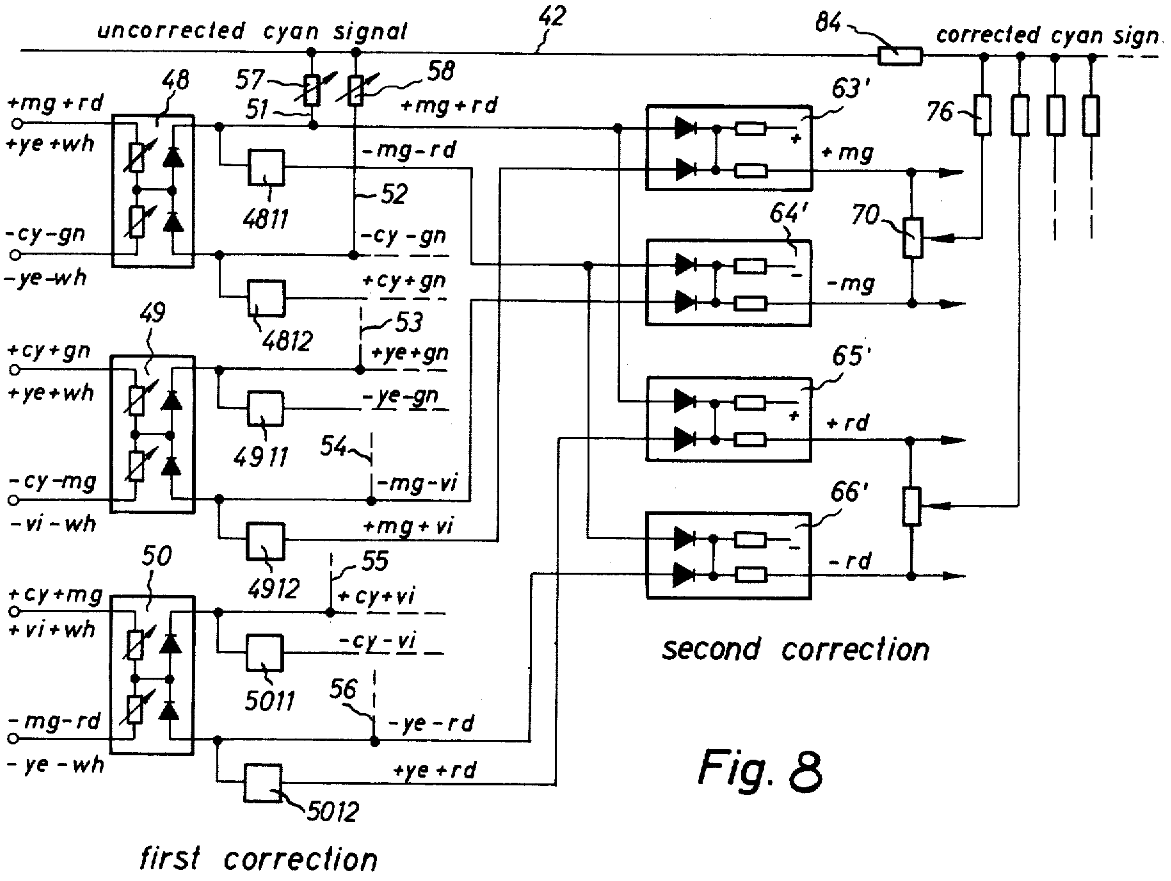
FIG. 8 is an alternate arrangement for carrying out the function performed by the circuit of FIG. 1.

FIG. 8 shows an alternate arrangement for carrying out the function performed by the second correction stage of FIG. 4. In FIG. 8 an arrangement is shown for two colors only since the corresponding diagram for the other colors is apparent. In this case the first difference signals coming from the stages 48, 49 and 50 of FIG. 4 are available with both polarities. This may for example be obtained by polarity inverters 4811, 4812, 4911, 4912, 5011 and 5012. Such inverters are shown in FIG. 9.

Figure 10:
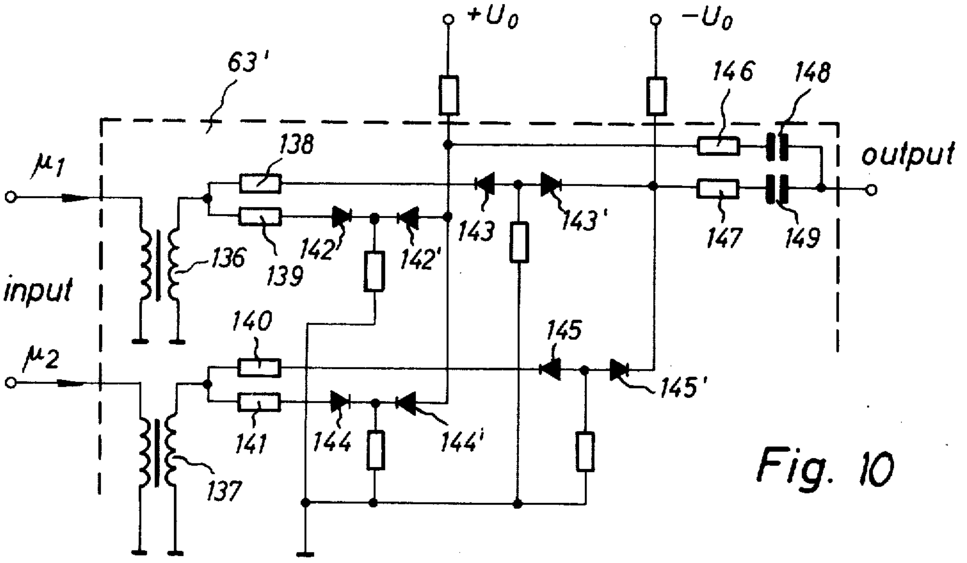
FIG. 10 is an alternate circuit for carrying out the function performed by the circuit arrangement of FIG. 3 for AC signal voltages.

Pairs of these first correction signals are formed in which the common signal component appears with the same polarity, and the smaller signal is chosen from the pairs in stages 63', 64', 65' and 66'. The function of such a stage is shown in FIGS. 3 and 10. It is advantageous to select the amplitude of the first color correction signals to be about the same amplitude as the common color signal component. For the other two basic colors, the amplitude at one input of the stages 63'–66' is approximately zero.

FIG. 9 shows an inverter circuit which may be used in the circuits shown in FIGS. 4 and 8 to change the polarity of the various signals. The circuit of FIG. 9 consists of two transistors 125 and 126 which are connected across the resistors 127 and 128 to a common voltage source 129 and across the resistors 130 and 131 to a source of constant current 132. The output terminal of the inverter is connected between the resistor 131 and the transistor 126. If a positive signal is applied to the transistor 125, this transistor will be conductive, and the negative constant current source 132 is applied across the resistor 131 to the output terminal of the inverter. If the transistor 125 is nonconductive, the constant current source causes a voltage drop across the resistor 131 so that the transistor 126 is conductive, and a positive potential, results at the output terminal.

FIG. 10 shows an alternate circuit for carrying out the function performed by the circuit arrangement of FIG. 3 for AC signal voltages. The two signal AC voltages $\mu_1$ and $\mu_2$ are applied across transformers 136 and 137 to the resistors 138–141. The alternating half-waves of the signals are split by the diodes 142, 143, 144 and 145. For the positive half-waves a minimum is obtained in a similar manner as described in connection with FIG. 7 by the diodes 142' and 144' and for the negative half-waves by the diodes 143' and 145' which are supplied from higher DC voltages $+U_0$ and $-U_0$.

The two half-waves of the selected smaller signal are recombined at the output of the stage at the resistors 146 and 147 and the capacitors 148 and 149.

What I claim is:

1. A method for producing at least one color signal useful in multi-color printing, comprising the steps of generating trichromatic primary color separation signals, forming difference signals between pairs of the trichromatic primary color separation signals, separating the difference signals according to their polarity such that each of the separated difference signals predominantly represents two of the six basic colors of the color space to thereby produce partial signals, inverting the partial signals to form inverted partial signals with the same amplitude but of opposite polarity from the existing partial signals, selecting a pair of signals from said partial signals and said inverted partial signals which in part represent the same basic color with the same polarity, and comparing the amplitudes of the signals within the selected pair to select the signal having the smaller amplitude of the pair, which signal substantially represents a single basic color useful in multi-color printing.

2. A method for producing at least one color signal useful in multi-color printing, comprising the steps of generating trichromatic primary color separation signals, forming difference signals between pairs of the trichromatic primary color separation signals, separating the difference signals according to their polarity such that each of the separated difference signals predominantly represents two of the six basic colors of the color space to thereby produce partial signals, inverting the amplitudes of the partial signals to form inverted partial signals, selecting a pair of said inverted partial signals which in part represent the same basic color with the same polarity, and comparing the amplitudes of the signals within the selected pair to select the signal having the greater amplitude of the pair, which signal will then substantially represent a single basic color useful in multi-color printing.

3. A method in accordance with claim 2 including the step of adding said separated first difference signals to the primary color separation signals for a first correction.

4. A method of color correction for multi-color printing using three primary color separation signals comprising the steps of separating each primary color separation signal into positive and negative primary color signals, forming first difference signals by adding to each of said positive primary color signals one of said negative primary color signals, separating said first difference signals into signals of positive and negative polarity, selecting six pairs of said separated first difference signals having signal components representing the same basic color but with different polarities, forming second difference signals of the selected pairs by adding the positive and negative first difference signals, separating said second difference signals into signals of positive and negative polarity, selecting pairs of the separated second difference signals with the same basic color but with different polarity, and adding said separated second signals to said primary color signals for color correction.

5. A method of color correction for multi-color printing using three primary color separation signals comprising the steps of separating each primary color separation signal into a positive and negative primary color signal, forming first difference signals by adding to each of said positive primary color signals one of said negative primary color signals of another primary color but with a different polarity to remove one color components and the white value, separating said first difference signals into a positive and a negative first difference signals, selecting a pair of said positive and negative first difference signals which have signal components representing the same basic color with the same polarity, selecting one of the two signals of each said pair with regard to instantaneous amplitude, wherein said selected signals represent individual basic colors, and adding said selected signals to the primary color separation signals for color correction.

6. A method in accordance with claim 5 wherein the one partial signal selected is the smaller of the two partial signals.

7. A method in accordance with claim 5 wherein the one partial signal selected is the larger of the two partial signals.

* * * * *